Figure 1:
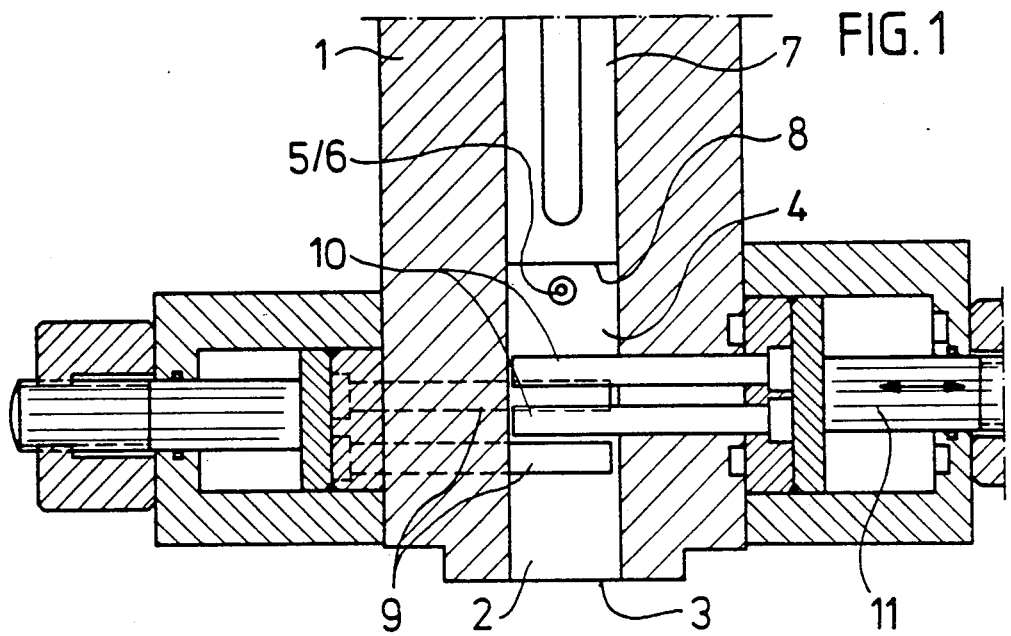

United States Patent [19]

Wallner

[11] Patent Number: 4,773,564
[45] Date of Patent: Sep. 27, 1988

[54] MIXING HEAD FOR PRODUCING A PREFERABLY CHEMICALLY REACTIVE MIXTURE FROM TWO OR MORE PLASTIC COMPONENTS

[75] Inventor: Josef Wallner, Holzkirchen, Fed. Rep. of Germany

[73] Assignee: Elastogran Maschinenbau GmbH, Strasslach, Fed. Rep. of Germany

[21] Appl. No.: 473,532

[22] Filed: Mar. 9, 1983

[30] Foreign Application Priority Data

Mar. 11, 1982 [DE] Fed. Rep. of Germany ....... 3208696

[51] Int. Cl.⁴ .............................................. B67D 5/60
[52] U.S. Cl. ................................... 222/145; 222/564; 366/336
[58] Field of Search ............... 366/336, 184, 177, 159, 366/338; 222/564, 190, 135, 145, 149, 200, 189; 422/133; 239/590.5

[56] References Cited

U.S. PATENT DOCUMENTS

| | | | |
|---|---|---|---|
| 3,263,928 | 8/1966 | Gusmer | 239/123 |
| 3,460,809 | 8/1969 | Hauss | 366/338 |
| 3,743,184 | 7/1973 | Mancus | 239/590.5 |
| 4,141,470 | 2/1979 | Schulte et al. | 222/564 |
| 4,370,062 | 1/1983 | Moody | 366/336 |

FOREIGN PATENT DOCUMENTS

| | | |
|---|---|---|
| 2065841 | 5/1976 | Fed. Rep. of Germany . |
| 2612812 | 9/1977 | Fed. Rep. of Germany . |

*Primary Examiner*—Joseph J. Rolla
*Attorney, Agent, or Firm*—Keil & Weinkauf

[57] ABSTRACT

In a mixing head, a housing (1) has a bore (2) in which a control piston (7) can be moved to and fro. One portion of the bore constitutes the mixing chamber (4), which is bounded by the end face of the control piston and by a plurality of restrictors (9) and (10) which are arranged in a row one next to the other and/or one behind the other, and can be slid into the bore. The restrictors are preferably introduced into the bore (2) from diametrically opposite sides, forming a cascade-like structure. Inlet orifices (5) and (6) for each plastic component enter the mixing chamber. As it flows, the mixture of plastic components is divided, by the cascade-like structure, into a plurality of part-streams and thereby subjected to additional mixing, and passes, with sufficiently laminar flow, into a mold.

4 Claims, 3 Drawing Sheets

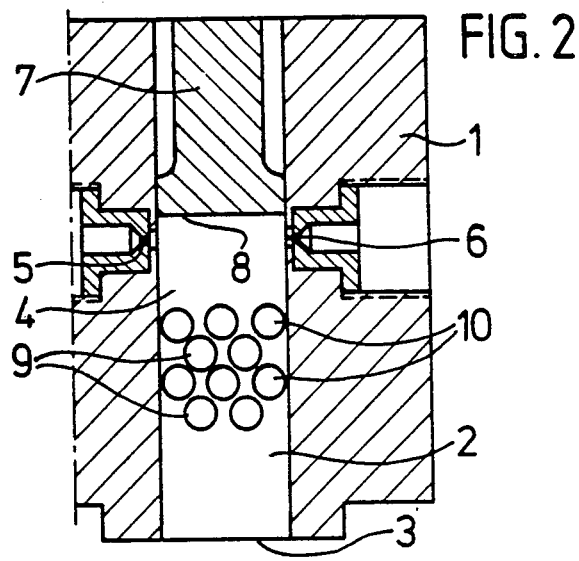
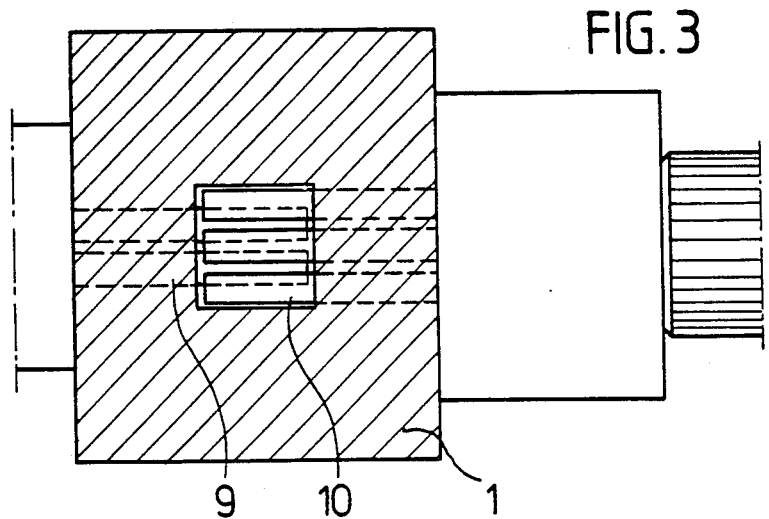

MIXING HEAD FOR PRODUCING A PREFERABLY CHEMICALLY REACTIVE MIXTURE FROM TWO OR MORE PLASTIC COMPONENTS

The invention relates to a mixing head for producing a preferably chemically reactive mixture from two or more plastic components, which head has a mixing chamber which possesses inlet orifices for the individual plastic components and an outlet orifice for the mixture of plastic components, and a control piston, arranged in the mixing chamber and having the same cross-section as the latter, which piston can be moved to and fro between a rear position, which leaves the inlet orifices open, and a position in the zone of the front outlet orifice, where it simultaneously shuts off the inlet orifices from the mixing chamber, a throttle member which can be advanced transversely into the mixing chamber being provided between the zone of the inlet orifices and the outlet orifice.

Mixing heads of the stated type as a rule work on the counter-current injection principle, ie. the injection orifices, constructed as nozzles or perforated plates, are arranged facing one another.

In order to achieve good mixing a certain pressure has to be maintained within the mixing chamber. Because of the low volume of the mixing chamber, this pressure is difficult to measure. Hence, the theoretical velocity of the reaction mixture leaving the mixing chamber is taken as a measure of the pressure. For example, it has been found that in the preparation of integral foams based on polyurethane, an exit velocity of 20 to 40 m/sec ensures good intensity of mixing. In the conventional mixing heads, the pressure in the mixing chamber is generated by vortex-inducing members or perforated plates in the outlet member downstream of the mixing chamber. Since these mixing heads are as a rule used to fill molds with the reaction mixture, it is necessary to ensure that the flow of the mixture leaving the mixing chamber is calmed, so that the mixture enters the mold cavity with laminar flow. The purpose of this requirement is to ensure that a continuous flow front is produced and that air bubbles, which might cause defects in the finished molding, are not whipped into the mixture. This laminar flow is created by deflecting or calming cones in the outlet member.

However, such mixing heads, provided with internal fitments in the outlet member, have to be flushed with solvent or compressed air, and the residual reaction mixture thus lost pollutes the environment.

It has already been disclosed that a throttle member can be introduced into the mixing chamber through the outlet orifice of the latter, in order to improve mixing and substantially displace the air present in the mixing chamber, so as to prevent air being whipped into the mixture. However, because of the low exit cross-section, the exit velocity is high, so that the desired continuous flow front on entering the mold is not guaranteed.

Modern force-controlled mixing heads advantageously operate without a flushing agent, and instead an expulsion piston expels the reaction mixture, remaining in the mixing chamber, towards the end of the mold filling process. This arrangement does not permit adapting the mixing chamber pressure to the particular requirements, nor permits guaranteeing laminar flow from the mixing chamber into the mold cavity.

Since the mixing intensity is insufficient, it has also been proposed to provide post-mixers between the mixing chamber and the mold cavity. These improve the degree of mixing and calm the stream of mixture which issues with turbulent flow from the mixing chamber. Such post-mixers are located in the mold parting plane, as is the runner. After the molding has hardened, the mixture remaining in the runner and postmixer has to be separated from the molding and constitutes waste. The sprue mark remaining on the molding is objectionable and requires subsequent finishing.

It is known, moreover, that in mixing heads with expulsion pistons, a restrictor, which can be advanced transversely into the mixing chamber may be provided between the zone of the inlet orifices and the exit orifice in order to be able to influence the degree of mixing by varying the back-pressure. However, this restrictor is unsuitable for imposing sufficiently laminar, calmed flow on the stream of mixture leaving the mixing chamber, in order to achieve a continuous flow front on entry of the mixture into the mold.

Finally, German Published Application DE-AS No. 2,612,812 discloses a mixing head which is intended to ensure good intensity of mixing through allowing the mixing chamber pressure to be adjusted. In this head, a throttle member is provided in the zone between the mixing chamber and the outlet orifice; it can be moved transversely to the mixing chamber and has a passage through which an expulsion piston can be moved into its expulsion position. This forms a type of additional mixing chamber, which however does not permit dividing the mixture stream formed into a plurality of part-streams.

It is an object of the present invention to provide a mixing head which ensures good mixing intensity through adjustability of the mixing chamber pressure, can be cleaned completely and permits calmed exit of the mixture of plastic components.

We have found that this object is achieved by the measures prescribed in the characterizing clause of claim 1.

According to the invention, the free flow cross-sections of a mixing chamber or outlet bore of relatively large cross-section are substantially reduced. At the same time, it is possible to reduce the mixing chamber volume. The mixture of plastic components flows through the outlet bore at different velocities and as it flows is divided into a plurality of part-streams—which causes additional mixing—and then passes, with sufficiently laminar flow, into a mold. The mixing chamber pressure can be varied by adjusting the stroke of the throttle member as well as of the control piston. Preferably, the movement of the control piston takes place in two part-strokes, so that it is also possible to compensate for errors of mixing in the initial and final stages of the entry of the plastic components into the chamber. Towards the end of an injection cycle, in particular, a further improvement in the quality of mixing can be achieved by appropriate synchronization of the restrictors and of the control piston by means of a control device which may operate electrically, hydraulically, mechanically and/or pneumatically.

Advantageous further developments of the mixing head according to the invention are given in sub-claims 2 and 3.

The drawings diagrammatically show illustrative embodiments of the mixing head according to the invention, and are explained in more detail below.

Figure 4:
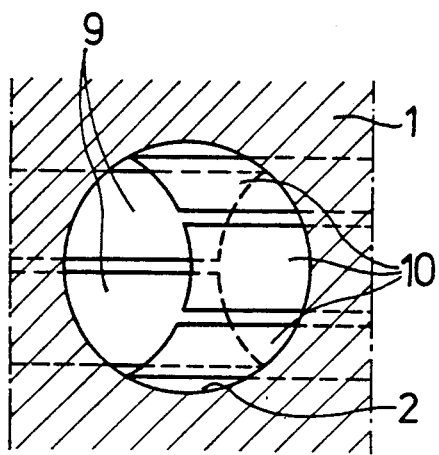
Figure 5:
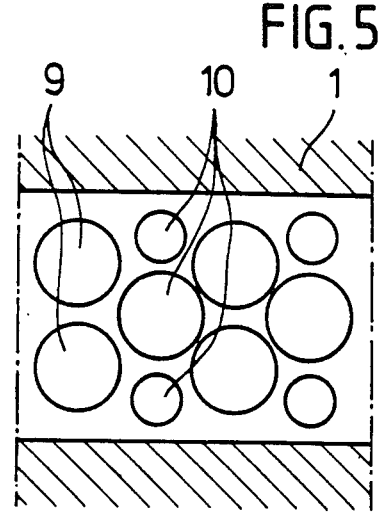
Figure 6:
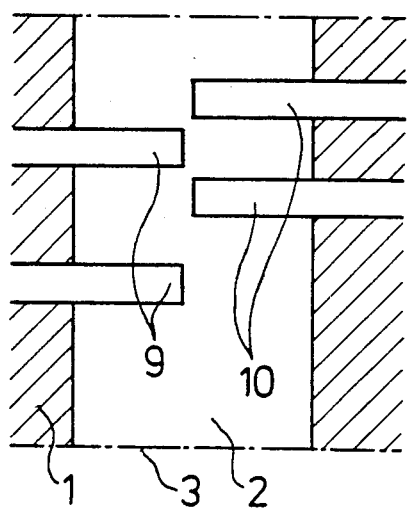
Figure 7:
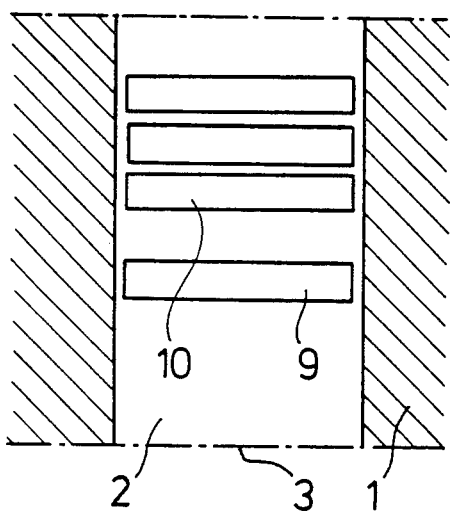

In the drawings:

FIG. 1 shows the mixing head in longitudinal section, with the control piston and the restrictors in the mixing position, FIG. 2 shows a side view, corresponding to FIG. 1, in section, FIG. 3 shows a part-section, corresponding to FIG. 1, of a top view, FIGS. 4 and 5 show part-sections of a mixing head with a circular outlet bore and circular restrictors, in two different views, FIG. 6 shows a part-view of a mixing head, with rectangular restrictors, in longitudinal section and FIG. 7 shows a side view, in section, of the mixing head according to FIG. 6.

Essentially, the mixing device consists of a housing 1 in which is provided a bore 2 for a control piston 7. The outlet orifice of the bore is marked 3. A portion of the bore is in the form of a mixing chamber 4 into which enter the inlet orifices 5 and 6 for each plastic component. In the mixing position of the control piston (FIG. 1), the mixing chamber, which is cylindrical or prismatic in cross-section, is bounded by the end face 8 of the control piston and by a plurality of restrictors 9 and 10. The restrictors which collectively represent a throttle member are arranged in rows or staggered, one next to the other and/or one behind the other, and are moved to and fro individually or by common adjustment devices 11. Preferably, the restrictors are introduced into the mixing chamber from diametrically opposite sides. The depth to which they enter the chamber can be varied, and accordingly different output rates of the plastic component mixture can be produced with the same mixing chamber pressure.

As a result of the restrictors 9 and 10, which can consist of circular or polygonal elements and are arranged at least approximately parallel to one another, a cascade-like structure is formed in the bore 2. With appropriate arrangement of the restrictors, it is also possible to achieve different passage cross-sections for the plastic component mixture issuing from the mixing chamber 4. These changes in cross-section lead to different velocities of the mixture stream and hence to additional mixing of the plastic components. In the lower zone (viewed in the direction of flow) of the cascade-like structure, the distances between the restrictors are made greater, so that a reduction in the flow velocity of the mixture stream results.

As soon as an injection cycle has been completed, the restrictors 9, 10 are retracted from the bore 2. This produces mechanical forced cleaning of the restrictors by stripping off any residual mixture from their surfaces. The control piston 7, whose cross-section matches that of the bore, thereafter ensures final cleaning of the mixing chamber 4 whilst executing its stroke, which takes it into the zone of the outlet orifice 3.

The different embodiments allow the mixing action and post-homogenization, as well as the flow velocity and the flow profile in the outlet cross-section, to be optimized for the particular product requirements and shape of the finished article.

We claim:

1. A mixing head for producing a preferably chemically reactive mixture from two or more plastic components, which head has a mixing chamber which possesses inlet orifices for the individual plastic components and an outlet orifice for the mixture of plastic components, and a control piston, arranged in the mixing chamber and having the same cross-section as the latter, which piston can be moved to and fro between a rear position, which leaves the inlet orifices open, and a position in the zone of the front outlet orifice, where it simultaneously shuts off the inlet orifices from the mixing chamber, a throttle member which can be advanced transversely into the mixing chamber being provided between the zone of the inlet orifices and the outlet orifice, wherein the throttle member consists of a plurality of parallel rows of rod-shaped restrictors, said rows extending in planes which are closely spaced from each other in the flow direction, with the restrictors in any given row being disposed in staggered relationship to the restrictors in an adjacent row so as to divide the mixture into a plurality of tortuous, cascade-like and substantially flat part-streams, and said restrictors being subdivided into two sets which two sets can be introduced from opposite sides into said chamber.

2. A mixing head as claimed in claim 1, wherein the restrictors have a circular cross-section.

3. A mixing head as claimed in claim 1, wherein the restrictors have a polygonal cross-section.

4. A mixing head as claimed in claim 1, wherein adjacent ones of said restrictors are unequally spaced from each other.

* * * * *